United States Patent [19]

Kim

[11] 4,055,528

[45] Oct. 25, 1977

[54] PHENOL-FORMALDEHYDE RESIN FOR FOUNDRY APPLICATIONS

[75] Inventor: Young D. Kim, Columbus, Ohio

[73] Assignee: Ashland Oil, Inc., Ashland, Ky.

[21] Appl. No.: 660,326

[22] Filed: Feb. 23, 1976

[51] Int. Cl.² ............................................. C08L 61/10
[52] U.S. Cl. .................................. 260/29.3; 260/57 R
[58] Field of Search .................. 260/29.3, 57 C, 57 R, 260/60, 38

[56] References Cited

U.S. PATENT DOCUMENTS

| 3,640,932 | 2/1972 | Schnur | 260/29.3 |
| 3,657,188 | 4/1972 | Perkins, Jr. | 260/60 |
| 3,723,368 | 3/1973 | Brown | 260/29.3 |

*Primary Examiner*—Theodore E. Pertilla
*Attorney, Agent, or Firm*—Van D. Harrison, Jr.

[57] ABSTRACT

Disclosed is a phenol-formaldehyde resin for foundry core making having a free formaldehyde content of less than one percent and a water content of 10 to 12 percent.

5 Claims, No Drawings

PHENOL-FORMALDEHYDE RESIN FOR FOUNDRY APPLICATIONS

NATURE OF INVENTION

The present invention relates to improved phenolic resins useful as "no-bake" foundry core binders. In another aspect it relates to a process for preparing such phenolic resins.

BACKGROUND OF THE INVENTION

In the foundry art, cores and molds used in making metal castings are generally prepared from shaped, cured mixtures of aggregate material (e.g. sand) and a binder. One of the preferred techniques of making these sand cores includes the basic steps of mixing the sand with a resin binder and a curing catalyst, molding the mixture to the desired shape and allowing it to cure and solidify at room temperature without the application of heat. Resins useful in this technique include the furfuryl alcohol-formaldehyde, furfuryl alcohol-urea-formaldehyde, and alkyd isocyanate resins as well as sodium silicate binders.

Among the resins available for this type of no-bake core making are those made by reacting phenol and aldehydes, primarily formaldehyde. A problem associated with the use of these phenol-formaldehyde resins is, however, the emission of formaldehyde fumes during the mixing of sand with the resin binder and catalyst, during the curing process, and subsequently during the casting operation, due to the presence of free or uncombined formaldehyde in the resin. This emission of formaldehyde is highly undesirable, since such odors are not only unpleasant but possibly may injure the health of workers in the area.

Ordinarily, the high viscosity of phenol-formaldehyde resins has required that they be diluted with an organic solvent such as methanol in order to obtain lower viscosities and a uniform distribution of the resin throughout the resin-sand mixture. It has been noted, however, that no-bake cores made of sand and phenol-formaldehyde resins dissolved in an alcohol solvent do not always cure satisfactorily. Instead they retain excess water, particularly in the innermost portions. The exact nature of this phenomenon is not understood, but it is thought that perhaps the migration of the more volatile alcohol vapors to near the surface of the core retards the subsequent evaporation of less volatile water from the center of the core during the curing process.

OBJECTS

One object of this invention is to make available a phenol-formaldehyde foundry resin of improved properties. Another object of the invention is to provide a phenol-formaldehyde resin for no-bake foundry applications having a low free formaldehyde content. Still another object of this invention is to provide a phenol-formaldehyde resin having a sufficient low viscosity to enable proper mixing with foundry sand without the prior addition of solvent to the resin. Other objects and advantages of the invention will be readily apparent, particularly to those skilled in the art, from the following disclosure.

SUMMARY OF THE INVENTION

Briefly stated, this invention in one aspect is a method for forming a phenolic resin for foundry use comprising heating phenol and formaldehyde in the presence of an alkaline catalyst in a mole ratio of formaldehyde to phenol of between 1.05 and 1.5; maintaining the reaction temperature at between 74° and 82° C until the free or unreacted formaldehyde content becomes less than one percent, neutralizing the cooled reaction product with an acid to a pH of 5.5 to 6.5; and dehydrating the reaction mixture to a viscosity of between 1.5 and 2.0 stokes and a water content of 10 to 12 percent by weight. In another aspect, this invention comprises the condensation product formed from the foregoing process.

DESCRIPTION OF THE INVENTION

In preparing the resin of the invention, it is preferred that the moles of formaldehyde per mole of phenol be at least between 1.05 to 1.5 and, more preferably, between 1.2 and 1.3 in the reaction mixture. In carrying out the condensation reaction of this invention, part of the phenol component can be substituted by other phenolic compounds such as cresol, xylenol, cresylic acid, alkyl phenols, such as tertiary butyl phenol, amyl phenols, and the like, including mixtures thereof. Phenol ($C_6H_5OH$) is, however, preferred. Part of the aldehyde can be substituted by other aldehydes, such as acetaldehyde, or compounds yielding aldehydes, such as paraformaldehyde. Preferred, however, is formaldehyde in aqueous solution in a concentration of between 37 and 50 percent by weight.

In order to maintain alkaline conditions during the condensation reaction, an inorganic alkaline or basic material soluble in water is used, such as sodium hydroxide, sodium carbonate, potassium hydroxide, potassium carbonate or barium hydroxide. Preferred is barium hydroxide in an amount of between 1.0 and 1.5 parts per 100 parts by weight of phenol.

The condensation reaction is carried out at elevated temperatures generally between 74° and 84° C and preferably between 75° and 79° C, and the reaction is continued until a sample of the reaction mixture shows a free formaldehyde content of less than one percent. This determination is most easily made by titrating the sample with sodium sulfite, a method well known to those skilled in the art. This determination can also be made by continually measuring the refractive index and terminating the reaction at a refractive index corresponding to a free formaldehyde content of less then one percent.

When the free formaldehyde content has diminished to the desired level, the reaction mixture is cooled to approximately 40° C and the pH adjusted with an acid, such as acetic or p-toluenesulfonic acid, to a pH of between 5.5 and 6.5, although a pH of about 6.0 is preferred. Acetic acid is preferred for the pH adjustment. The reaction mixture is then dehydrated by applying a vacuum and heat (up to about 50° C) until the viscosity reaches a value of 1.5 to 2.5 stokes. This will result in a resin having a water content of approximately 10 to 12 percent by weight. After it has been cooled, the resulting resin is then ready for use as a foundry resin.

To make the desired sand core, sand, catalyst, and the afore described low free formaldehyde resin are mixed in the desired proportions. The catalyst used to solidify and cure the sand resin mix is p-toluenesulfonic acid or benzenesulfonic acid in a ratio of 10 to 60 parts by weight per 100 parts by weight of resin. Preferably the amount of p-toluenesulfonic acid is between 40 to 70 parts per 100 parts of resin and 20 to 50 parts per 100 parts of resin for benzenesulfonic acid. The proportion of resin mixed with sand can be between 1 and 5 parts by weight of resin per 100 parts of sand, although a ratio of between 1.5 and 2 parts resin per 100 parts of sand is preferred. The mixture is shaped, either in a mold or by hand, and is allowed to stand at room temperature until the resin has cured. Ordinarily this will require from 10 minutes to 2 hours.

EXAMPLE 1

Into a three-neck flask were charged 100 grams of phenol and 103 grams of a 37 percent by weight aqueous solution of formaldehyde. The mole ratio of formaldehyde to phenol was 1.2 to 1. The pH of the mixture was adjusted to between 8.7 and 9.5 by adding 3 grams of barium hydroxide of the formula $Ba(OH)_2.8H_2O$. The temperature of the reaction mixture was then raised to 75° C and maintained at that temperature for between 4 and 5 hours. During this time, the free formaldehyde content of the reaction mixture was determined every half hour. When, after the end of the 4 to 5 hour period, the free formaldehyde content had decreased to less than one percent, the reaction mixture was cooled to 50° C and neutralized to a pH of 6.6 by the addition of 110.5 grams of a 50 percent by weight solution of p-toluenesulfonic acid. The mixture was then subjected to a vacuum at a temperature of approximately 50° C and was dehydrated to a viscosity of 1 to 1.5 stokes and a water content of 15 to 18 percent by weight.

EXAMPLE 2

In a procedure similar to Example 1, 100 grams of phenol and 103 grams of a 37 percent aqueous solution of formaldehyde were charged to a reactor vessel with 3 grams of barium hydroxide, $Ba(OH)_2.8H_2O$. The resultant mixture had a pH of 9.0. When the free formaldehyde content was reduced to less than one percent by weight, the mixture was adjusted to a pH of 6.5 by the addition of 54 grams of a 30 percent by weight aqueous solution of acetic acid. The resultant product was then dehydrated by applying vacuum to a final viscosity of 2 to 2.5 stokes and a water content of 7 to 10 percent by weight.

EXAMPLE 3

In a procedure similar to Example 1, 100 grams of phenol and 78 grams of a 50 percent aqueous solution of formaldehyde are charged to a reactor vessel with approximately 3 grams of barium hydroxide, $Ba(OH)_2.8H_2O$. The resultant mixture has a pH of 9.0. When the free formaldehyde content is reduced to less than one percent by weight, the mixture is adjusted to a pH of about 6.6 by the addition of 54 grams of a 30 percent by weight aqueous solution of acetic acid. The resultant product was then dehydrated by applying vacuum to a final viscosity of 1 to 1.5 stokes and a water content of about 16 percent by weight.

EXAMPLE 4

In a procedure similar to Examples 1 and 2, 47.7 grams of phenol, 49.0 grams of a 37 percent aqueous solution of formaldehyde, and 1.43 grams of barium hydroxide, $Ba(OH)_2.8H_2O$, were reacted to a condition where less than 1 percent of free formaldehyde was present. Carbon dioxide gas was then bubbled through the reaction product until a pH of 5.60 was obtained. A noticeable amount of barium carbonate resulted. The product was then filtered to remove suspended solids and subjected to a vacuum at a temperature of 35° to 40° C until a viscosity of 1.25 stokes had been reached. The procedure of treating with carbon dioxide and filtering is thought to prolong the shelf life of the resin product.

EXAMPLE 5

Comparison tests were made with two commercial phenol-formaldehyde resins, designated A and B in the following table, in which the ratio of formaldehyde to phenol was approximately 1.2 to 1, but in which the free formaldehyde content was substantially higher than in the resin of this invention, designated as C below and made according to the procedure shown in Example 2. In Run No. 1, the A-brand resin and the resin of this invention, resin C, were mixed in a ratio of 100 parts by weight of Wedron sand, 1.5 parts of resin binder and 30 parts by weight of p-toluenesulfonic acid. In Run No. 2, the same proportions of sand, resin and catalyst were used, except the catalyst was benzenesulfonic acid. These mixtures were shaped into standard AFS tensile test samples and tensile strengths measured as indicated in the table. In Run No. 3, a commercial resin B was compared with resin C, using Wedron sand in the ratio of 100 parts by weight of sand, 1.5 parts of resin, and 40 parts of p-toluenesulfonic acid.

| Run No. | 1 | | 2 | | 3 | |
|---|---|---|---|---|---|---|
| Resin | A | C | A | C | B | C |
| Catalyst | p-toluene-sulfonic acid | | benzene-sulfonic acid | | p-toluene-sulfonic acid | |
| Parts by Weight of | | | | | | |
| Sand | 100 | 100 | 100 | 100 | 100 | 100 |
| Resin | 1.5 | 1.5 | 1.5 | 1.5 | 1.5 | 1.5 |
| Catalyst | 30 | 30 | 30 | 30 | 40 | 40 |
| Tensile Strength of AFS Test Samples, psi, after* | | | | | | |
| 2 hours | 73(55) | 239(71) | 45(43) | 226(63) | 226(73) | 221(71) |
| 4 hours | 174(65) | 315(74) | 35(32) | 216(65) | 291(71) | 337(77) |
| 24 hours | 343(60) | 396(74) | 67(48) | 300(71) | 260(73) | 348(79) |
| Work Time, minutes, | 11 | 22 | 4 | 11 | 15 | 12 |

*Figures in paranthesis indicate scratch hardness

From the foregoing data it is readily apparent that the C resin, the resin of the invention, imparts improved tensile strength properties to said cores over the resins A and B. In addition, by virtue of its decreased free formaldehyde content, substantially less formaldehyde odors are released during the curing process.

I claim:
1. A no-bake foundry sand composition comprising:
   a. a foundry aggregate;
   b. between about 1 and about 5 parts by weight per 100 parts of aggregate of a phenolaldehyde resin made by:
      1. heating phenol and an aldehyde in a mole ratio of aldehyde to phenol of between about 1.05 to 1 and about 1.5 to 1 in the presence of an alkaline catalyst until the free aldehyde content is less than one percent;
2. neutralizing the reaction product to a pH of about 5.5 to about 6.5 by adding an acid; and
3. dehydrating the resultant product to a viscosity of between about 1.5 and about 2.0 stokes and a water content of between about 10 and about 12 percent by weight, and c. between about 10 and about 60 parts by weight per 100 parts of resin of a curing catalyst.

2. The foundry sand composition of claim 1, wherein said curing catalyst is p-toluenesulfonic acid.

3. The foundry sand composition of claim 1, wherein said curing catalyst is benzenesulfonic acid.

4. The composition of claim 1 wherein said aldehyde is an aqueous solution of an aldehyde.

5. The composition of claim 4 wherein said aldehyde is formaldehyde.

* * * * *